(12) United States Patent
Ahn (10) Patent No.: US 7,746,488 B2
(45) Date of Patent: Jun. 29, 2010

(54) NETWORK-BASED IMAGE FORMING DEVICE AND PRINT SECURE METHOD THEREOF

(75) Inventor: Sang-kil Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1400 days.

(21) Appl. No.: 10/936,642

(22) Filed: Sep. 9, 2004

(65) Prior Publication Data

US 2005/0088680 A1 Apr. 28, 2005

(30) Foreign Application Priority Data

Oct. 27, 2003 (KR) .................. 10-2003-0074984

(51) Int. Cl.
G06F 15/00 (2006.01)
H04N 1/00 (2006.01)

(52) U.S. Cl. .................. 358/1.14; 358/1.15; 358/1.16; 399/80; 726/31

(58) Field of Classification Search ............... 358/1.14, 358/1.15, 1.16; 399/80; 710/8; 713/155, 713/193; 726/4, 28, 29, 30, 31
See application file for complete search history.

(56) References Cited

U.S. PATENT DOCUMENTS

| 5,066,977 | A  | * | 11/1991 | Yoshizuka ................... 399/80 |
| 5,452,099 | A  | * | 9/1995  | Von Meister ................ 358/403 |
| 6,160,629 | A  | * | 12/2000 | Tang et al. ................... 358/1.1 |
| 6,985,244 | B1 | * | 1/2006  | Bhogal et al. ............... 358/1.15 |
| 7,142,730 | B2 | * | 11/2006 | Michiie et al. ............. 358/1.15 |
| 2002/0018230 | A1 | * | 2/2002 | Iwadate ..................... 358/1.14 |
| 2002/0032703 | A1 | * | 3/2002 | Gassho et al. ............... 707/527 |
| 2002/0062453 | A1 | * | 5/2002 | Koga .......................... 713/202 |
| 2002/0120855 | A1 | * | 8/2002 | Wiley et al. .................. 713/189 |
| 2003/0182475 | A1 | * | 9/2003 | Gimenez ........................ 710/8 |
| 2004/0095595 | A1 | * | 5/2004 | Jacobsen .................... 358/1.14 |
| 2004/0114023 | A1 | * | 6/2004 | Jacobsen et al. ............ 347/106 |
| 2004/0221068 | A1 | * | 11/2004 | Ohta et al. ..................... 710/1 |
| 2004/0225886 | A1 | * | 11/2004 | Lahey et al. ................. 713/193 |

(Continued)

FOREIGN PATENT DOCUMENTS

JP 2001-075748 3/2001

(Continued)

*Primary Examiner*—Kimberly A Williams
(74) *Attorney, Agent, or Firm*—Roylance, Abrams, Berdo & Goodman, L.L.P.

(57) ABSTRACT

A network-based image forming device and method for storing and printing files sent from at least one user terminal connected through a network is disclosed. The network-based image forming device and method comprises an interface unit for providing a communication interface with the user terminal; a storage unit for storing a protected file and the print-authorized user information if the protected file having print-authorized user information set therein is sent from the user terminal through the interface unit; and a control unit for displaying a list of the files stored in the storage unit in response to a display request signal, and if a file selected out of the displayed list of files is a protected file, displaying a request message to request an input of user information and determine whether the user is an authorized user, and, if the user information input in response to the message matches the print-authorized user's information set in the selected file, printing the selected file.

20 Claims, 4 Drawing Sheets

U.S. PATENT DOCUMENTS

| | | | |
|---|---|---|---|
| 2005/0111867 A1* | 5/2005 | Hatano | 399/80 |
| 2007/0201723 A1* | 8/2007 | Ito et al. | 382/100 |
| 2007/0211282 A1* | 9/2007 | Okada | 358/1.15 |
| 2008/0180753 A1* | 7/2008 | Maeno | 358/3.28 |
| 2008/0263675 A1* | 10/2008 | McIntyre | 726/28 |

FOREIGN PATENT DOCUMENTS

| | | |
|---|---|---|
| JP | 2001-277650 | 10/2001 |
| KR | 1999-0038042 | 6/1999 |
| KR | 2001-0035568 | 5/2001 |
| KR | 2001-0048750 | 6/2001 |

\* cited by examiner

NETWORK-BASED IMAGE FORMING DEVICE AND PRINT SECURE METHOD THEREOF

This application claims benefit under 35 U.S.C. § 119(a) from Korean Patent Application No. 2003-74984, filed on Oct. 27, 2003, the entire contents of which is incorporated herein by reference.

BACKGROUND OF THE INVENTION

1. Field of the Invention

The present invention relates to a network-based image forming device employing a storage medium such as hard disc drives and a print secure method thereof. More particularly, the present invention relates to a network-based image forming device and a print secure method thereof which enable users to secure a file being stored in a storage medium to allow printing of the stored files only for authorized users.

2. Description of the Related Art

An image forming device such as a printer is connected through a wired or a wireless Local Area Network (LAN) so that a plurality of users can efficiently share the printer. The network-based printer uses internal or external hard disc drives (HDDs) as a mass storage device to store files which are prepared in the application programs on user terminals. The network-based printer also prints the stored files.

Storing the files in hard disc drives has an advantage because the files can be independently printed without being connected to a user terminal such as a computer. However, because the files stored in a conventional hard disc drive are accessible by general users, the files pose a secure problem. Additionally, because the files remain in the hard disc drives unless deleted by users, this results in inefficient utilization of storage space.

Accordingly, a new method is required to keep the files in the hard disc drives secure, and also to enable efficient use of the storage space of the hard disc drives.

SUMMARY OF THE INVENTION

The present invention has been developed in order to solve the above drawbacks and other problems associated with the conventional arrangement. An aspect of the present invention is to provide a network-based image forming device and a print secure method thereof, which stores secure files in a storage medium provided in a network-based image forming device and identifies a print-authorized person who can access and print the secure files.

It is another aspect of the present invention to provide a network-based image forming device and a print secure method thereof, which stores information on an number of predetermined pages of authorized printouts in the files being stored in a storage medium, and deletes print files upon reaching the predetermined number of pages authorized to be printed.

The above aspects and or other features of the present invention are substantially realized by providing a network-based image forming device for storing and printing a print-purpose file sent from at least one user terminal connected through a network, comprising an interface unit for providing a communication interface with the user terminal. The device also includes a storage unit for, if receiving a secure file having print-authorized person information set therein is sent from the user terminal through the interface unit. The device stores the sent secure file and the print-authorized person's information. A control unit displays a list of files stored in the storage unit according to a display request signal. If a file selected out of the displayed list of files is a secure file, the control unit displays a request message in order to request an input of user information and determine whether the user is authorized to print. If the user information input in response to the request message matches the print-authorized person's information set in the selected file, the selected file is printed.

The print-authorized person's information includes names and passwords of print-authorized people, and the control unit performs print tasks to print the selected file if the input user information corresponds to the print-authorized person's name and password set in the selected file.

The print-authorized person information further comprises an number of pages of authorized printouts which are allowed for the print-authorized person, and, if the input user information corresponds to the print-authorized person information set in the selected file, the control unit displays a request message to request an input of pages of requested printouts, and, if the pages of requested printouts input in response to the request message falls within a range of the pages of authorized printouts for the print-authorized person set in the selected file, performs print tasks to print the selected file according to the pages of requested printouts.

The control unit decreases the number of pages of authorized printouts for the print-authorized person set in the file as the file stored in the storage unit is printed, and, if the pages of authorized printouts of all of the print-authorized persons are decreased to zero, deletes the file from the storage unit.

The display request signal is input through an input unit provided on a main body of the network-based image forming device or through an input unit provided on the user terminal. The list of files is displayed through an input unit provided on a body of the network-based image forming device or through an input unit provided on the user terminal.

According to one aspect of the present invention, a print secure method for network-based image forming devices which is capable of storing in a storage unit files sent from at least one user terminal connected through networks, and printing the stored print files is provided. The print secure method comprises storing a secure file and print-authorized person information in the storage unit if the secure file having the print-authorized person's information set therein is sent from the user terminal. A list of the files stored in the storage unit is displayed based on a display request signal. If a file is selected from the displayed list of the files it is determined whether the selected file is a protected file. A message to request an input of user information is displayed if the selected file is the protected file. The selected file is printed if the user information input in response to the message matches the print-authorized person information set in the selected file.

The storage step comprises determining whether the files sent from the user terminal are storage-purpose files. If the file is for storage, it is determined whether the file is a protected file. If the file is the protected file, print-authorized person information set in the secure file is extracted. The protected file and the extracted print-authorized person information is then stored in the storage unit.

According to another aspect of the present invention, a network-based image forming device for storing files sent from at least one user terminal connected through networks and printing the stored files is provided. The network-based image forming device comprises an interface unit for providing a communication interface with the user terminal. The device further comprises a storage unit for storing the files sent from the user terminal through the interface unit and printing authorized pages set in the print files. A control unit displays a list of the files stored in the storage unit based on a display request signal. If a file is selected from the displayed list of the files, a request message is displayed to request an input of pages of requested printouts for the selected file. If the pages of requested printouts as input in response to the request message fall within a range of the pages of authorized printouts set in the selected file, the selected file is printed according to the pages of requested printouts.

The control unit displays a request message to request the input of pages of requested printouts only if the pages of authorized printouts set in the selected file exists.

The control unit decreases the number of pages of authorized printouts set in the file stored in the storage unit when the file is printed, and, if the number of authorized pages are decreased to zero, the file is deleted from the storage unit.

According to yet another aspect of the present invention, a secure print secure method for network-based image forming devices which is capable of storing in a storage unit files sent from at least one user terminal connected through networks and printing the stored print files is provided. The print secure method comprises displaying a list of the files stored in the storage unit in response to a display request signal. If a file is selected from the displayed list of the files, a request message is displayed to request an input of the number of pages of requested printouts for the selected file. If the number of pages of requested printouts, which are input in response to the request message, fall within a range of the pages of authorized printouts set in the selected file, processing such that the selected file is printed according to number of the pages of requested printouts.

BRIEF DESCRIPTION OF THE DRAWINGS

The above aspects and features of the present invention will be more apparent by describing certain embodiments of the present invention with reference to the accompanying drawings, in which.

In the drawings, it should be noted that the same or similar elements are denoted by the same reference numerals even though they are depicted in different drawings.

DETAILED DESCRIPTION OF THE PREFERRED EMBODIMENTS

Certain embodiments of the present invention will now be described in greater detail with reference to the accompanying drawings.

The matters defined in the description such as a detailed construction and elements are exemplary and are used merely to assist in understanding the invention. Thus, it should be apparent to those skilled in the art that the embodiments of the present invention can be performed without the specific examples defined herein. Also, well-known functions or constructions are not described in detail since they would unnecessarily obscure the invention.

Figure 1:
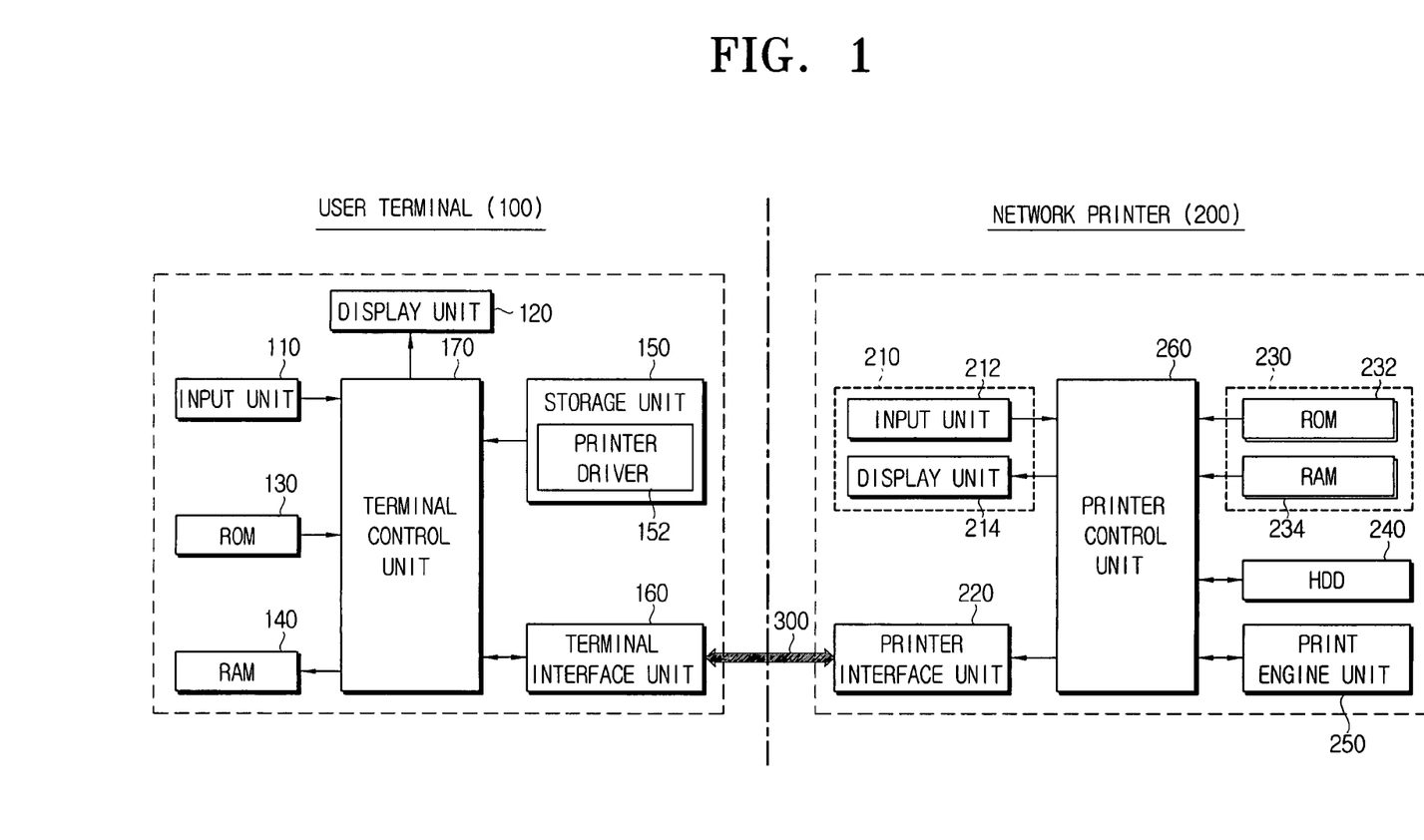
FIG. 1 is a block diagram of a printing system having a network-based image forming device according to an embodiment of the present invention.

FIG. 1 is a schematic block diagram of a printing system having a network-based image forming device according to an embodiment of the present invention.

Referring to FIG. 1, a printing system according to an embodiment of the present invention comprises a user terminal 100 and a network-based printer (hereinafter, referred to as a network printer) 200. The user terminal 100 and the network printer 200 are interconnected through a communication interface 300. The communication interface 300 may be a wired or a wireless Local Area Network (LAN) or any other suitable communication interface. Although the network printer 200 is described as the network-based image forming device according to an embodiment of the present invention, it should be appreciated that the present invention is applicable to various types of network-based image forming devices other than the network printer 200, such as network-based combination machines.

The user terminal 100 comprises an input unit 110, a display unit 120, a Read Only Memory (ROM) 130, a Random Access Memory (RAM) 140, a storage unit 150, a terminal interface unit 160, and a terminal control unit 170.

The input unit 110 applies to the terminal control unit 170 a key input signal based on a user's key operation. The input unit 110 may be a keyboard, a mouse, a touch panel, or any other suitable input device.

The display unit 120 is a general monitor, which displays the operation states of the user terminal 100 according to the controls of the terminal control unit 170.

The ROM 130 is a non-volatile memory device, which stores various control programs for implementation of the functions of the user terminal 100.

The RAM 140 is a volatile memory device, which temporarily stores necessary data for the execution of the programs for the terminal control unit 170.

The storage unit 150 has application programs (not shown) for the preparation of various documents and a printer driver 152.

The printer driver 152 operates as a converter which converts the documents prepared in the application program to a suitable language understandable by the network printer 200. The printer driver 152 provides a print option setting window, enabling a user to set desired print options for the documents prepared in application programs.

Figure 2:
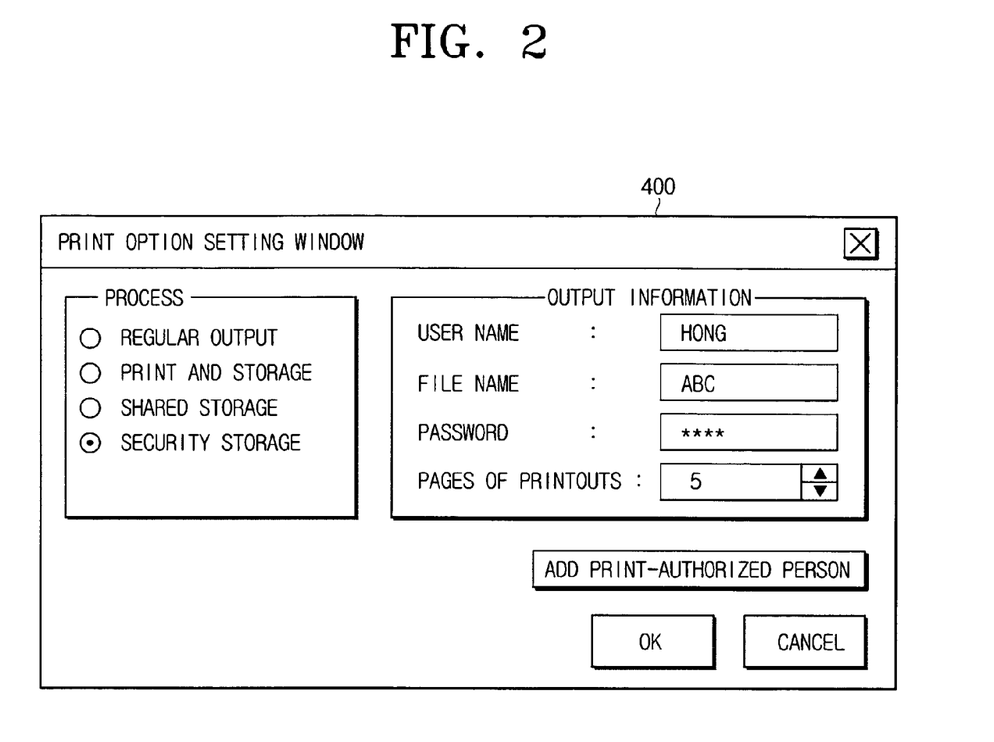
FIG. 2 is an exemplary view of a print option setting window provided by a printer driver shown in FIG. 1.

As shown in FIG. 2, the print option setting window 400 provided by the printer driver 152 has menu options enabling a user to set the items of "process" and "output information". If a user wants to send a file prepared in an application program to the network printer 200 and store the file with a secure function, the user selects a 'secure storage' option out of the options of the "process" menu. In order to set a secure function, the user inputs a user name, a file name, a password setting, and the pages of printouts, which are the options of the "output information" menu. Also, the print option setting window 400 in an embodiment of the present invention has an "Add print-authorized person" function which can authorize a plurality of users to print the file. Therefore, a user can designate as many people as he or she wants to authorize by selecting the "Add print-authorized person" function. Information such as the password and the pages of authorized printouts may be set respectively, depending on the print-authorized person.

The terminal interface unit 160 is connectible with the network printer 200, providing an interface for communication with the network printer 200. The terminal interface unit 160 sends to the network printer 200 a file prepared in an application program and print option information set through the print option setting window 400 provided by the printer driver 152, and receives information sent from the network printer 200.

The terminal control unit 170 controls the overall operation of the user terminal 100 based on a control program stored in the ROM 130. For instance, if the terminal control unit 170 receives a print command for printing a file prepared in an application program, the terminal control unit 170 drives the printer driver 152. The display unit 120 displays the print option setting window 400 provided by the printer driver 152. Through the print option setting window 400 displayed on the display unit 120, the user sets desired print options with respect to the stored file. For example, the user sets information on the print-authorized person, using the print option setting window 400. When the print options are set by the user, the terminal control unit 170 sends the set print options and the corresponding file to the network printer 200.

Referring now to FIG. 1, the network printer 200 has an operation panel 210, a printer interface unit 220, a memory unit 230, a hard disc drive (HDD) 240, a print engine unit 250, and a printer control unit 260.

The operation panel 210 has a plurality of operation keys for a user to select and set the functions supported by the network printer 200, and includes an input unit 212 for applying a key operation signal based on a key operation to the printer control unit 260 and a display unit 214 for displaying operation states of the network printer 200 according to the controls of the printer control unit 260.

The printer interface unit 220 is connectible with the user terminal 100, providing an interface for communication with the user terminal 100. The printer interface unit 200 receives a file from the user terminal 100 through the terminal interface unit 160, or sends to the user terminal 100 information about a list of files stored in the hard disc drive 240.

The memory unit 230 has a ROM 232 as a non-volatile memory device for storing various control programs for implementation of the functions of the network printer 200, and a RAM 234 as a volatile memory device for storing data generated during the operation of the network printer 200.

The hard disc drive 240 stores the files sent from the user terminal 100 through the printer interface unit 220. In general, the storage space of the hard disc drive 240 is divided into a data record area and an additional information record area. The data record area stores the files, and the additional information record area stores information about the storage location of the files, and print option information including the print-authorized person's information set in each file. If a file stored on the data record area is a protected file that requires a secure function, information such as the file name, the print-authorized person, the password, and the number of pages of authorized printouts for the print-authorized person, is stored on the additional information record area. If the file stored on the data record area is a general file which does not require a secure function, then only the file name and the printable pages need to be stored on the additional information record area.

Although the hard disc drive 240 is described as a storage device for the print files, the storage device is not exclusively limited to the hard disc drive. For example, the storage device may be other types of storage media such as memory cards.

The print engine unit 250 performs print tasks, for printing the stored file onto paper sheets according to the controls of the printer control unit 260.

The printer control unit 260 controls the overall operations of the network printer 200 based on a control program stored in the ROM 232. The printer control unit 260 determines whether a file sent from the user terminal is for printing or for storage. If the sent file is determined to be a file to store, the printer control unit 260 determines whether the file is a protected file. If the file is determined to be a protected file, the printer control unit 260 extracts print information set in the file, and stores the file in the hard disc drive 240 together with the extracted print information.

Additionally, the printer control unit 260 displays a list of the files stored in the hard disc drive 240 according to a print file list display request signal input from the input unit 212 provided on the operation panel 210 or the user terminal 100. The files stored in the hard disc drive 240 can be displayed on the display unit 214 provided on the operation panel 210, or on an external display unit when a Remote Control Panel (RCP) program is used. The RCP program connects the user terminal 100 to the network printer 200 so that a user can check a list of the print files stored in the hard disc drive 240. In addition, the user can select print files on the print file list displayed on the display unit 120 and send a print command for the selected files to the network printer 200.

If a certain file is selected from the print file list through the input unit 212 provided on the operation panel 210 or the input unit 110 provided on the user terminal 100, the printer control unit 260 determines whether the selected file is a protected file. If so, the printer control unit 260 performs print tasks to print the selected file only if the user information and the password information, which are input by users, correspond to those set in the selected file.

In an embodiment of the present invention, the printer control unit 260 may display a request message prior to performing the printing operation, for requesting a user to input information on the requested number of pages of printouts for the selected file, and perform the print tasks only if the requested number of pages of printouts input by the user in response to the request message falls in the authorized range of the pages of printouts set in the selected file. When the pages of authorized printouts are decremented to zero, the printer control unit 260 deletes the corresponding file from the hard disc drive 240.

Hereinafter, descriptions will be made to a print secure method for a network printer according to an embodiment of the present invention with reference to FIG. 3 and FIG. 4.

Figure 3:
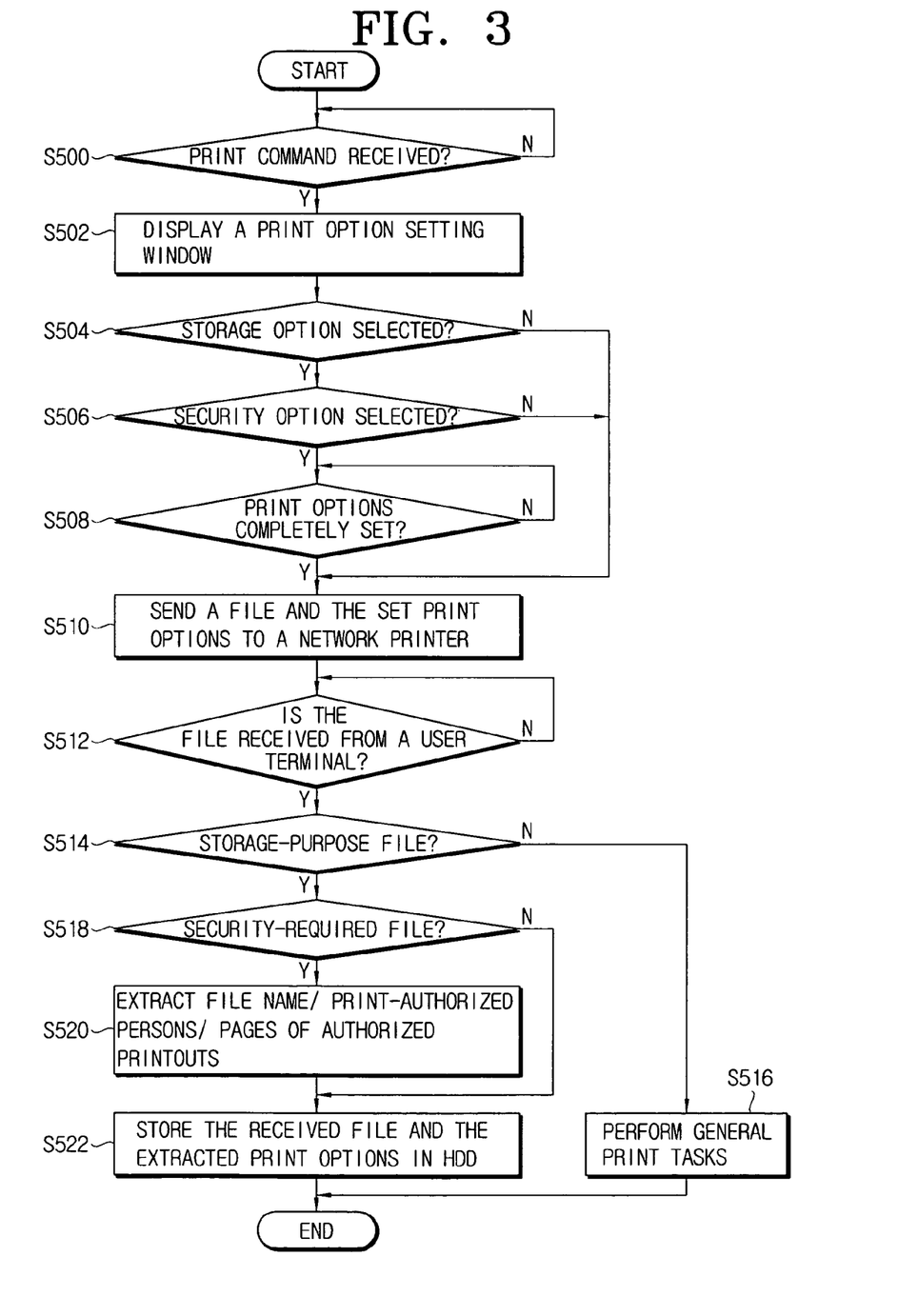
FIG. 3 is a flow chart outlining the processes of a secure option setting method for user terminals and a print file storage method for network-based printers both of which being shown in FIG. 2.
Figure 4:
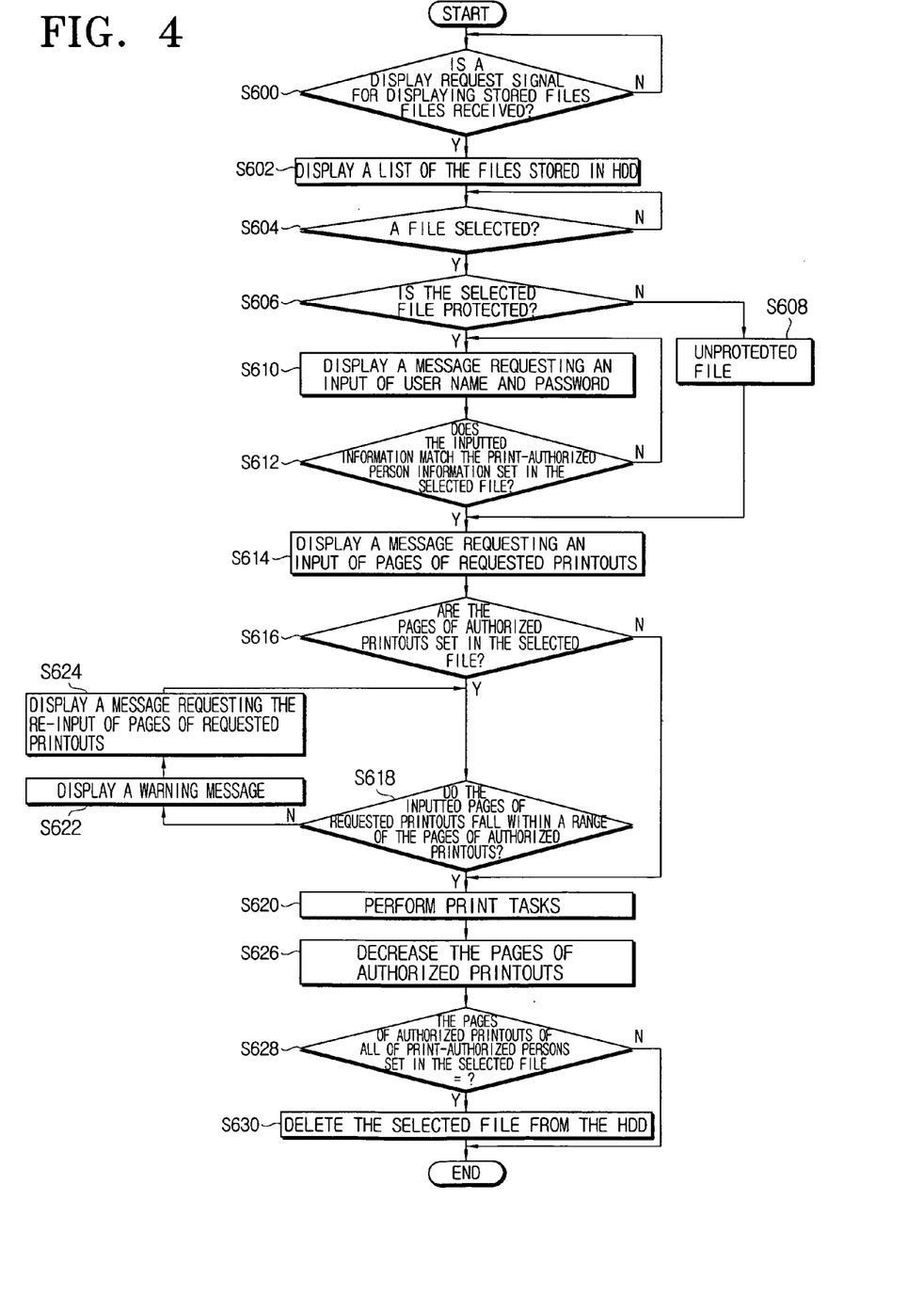
FIG. 4 is a flow chart outlining a secure print method for network-based printers shown in FIG. 2.

FIG. 3 is a flow chart illustrating the processes of a secure setting method for the user terminal and a file storage method for the network printers which are shown in FIG. 2, and FIG. 4 is a flow chart illustrating the processes of a print secure method for the network printer shown in FIG. 2.

Referring to FIG. 3, the terminal control unit 170 determines whether a print command signal is received through the input unit 110 in step S500. If so, the terminal control unit 170 drives the printer driver 152 to provide the print option setting window 400, so that a user can set desired print options. Accordingly, the print option setting window 400 as shown in FIG. 2 is displayed on the display unit 120 in step S502.

A user can set print options with respect to the files prepared in application programs, using the print option setting window 400 displayed on the display unit 120. In other words, the user can select print options by using the print option setting window 400, to determine conditions such as whether to print a prepared file, to store the file in the hard disc drive 240 after printing, or to only store the print file in the hard disc drive 240. If the user wishes to store a file in the hard disc drive 240, the user can select between a shared storage and protected storage according to whether they want to authorize all users to print the file or to limit it to certain number of people. If a provider of a file wants the protected storage, the user sets necessary information such as the print authorized person, passwords, and number of pages of authorized printouts. The user may set the number of pages of authorized printouts even for the unprotected files.

The printer driver 152 determines whether a storage option is selected in step S504, and determines whether the selected storage option is a secure storage function in step S506. If the option of 'Security storage' is checked out of the options of "Process" menu displayed on the print option setting window 400, the printer driver 152 determines that a file is selected to be stored securely.

The printer driver 152 determines whether the print options are completely set in step S508, and, if so, sends the set print options and a corresponding file to the network printer 200 through the terminal interface unit 160 in step S510.

The printer control unit 260 determines whether a file is received from the user terminal 100 through the printer interface unit 220 in step S512. If the file is received from the user terminal 100, the printer control unit 260 determines whether the received file is a storage purpose file in step S514. The printer control unit 260 parses the header portion of the received print file so that it can determine whether the corresponding file is for printing or for storage.

If the received file is not for storage in step S514, the printer control unit 260 performs a general print task in order to print the corresponding file in step S516. If the received file is determined to be for storage in step S514, the printer control unit 260 determines whether the storage file is a protected file which requires secure function in step S518.

If the storage file is determined to be a protected file as a result of the determination in step S518, the printer control unit 260 extracts information such as a file name, print-authorized person, password, and the number of pages of authorized printouts allocated to the authorized persons in step S520. The printer control unit 260 classifies and stores the received files and the extracted print options in the hard disc drive 240 in step S522.

Next, a discussion will be provided on a method for printing files stored in the hard disc drive 240 provided in the network printer 200 with reference to FIG. 4. In particular, the descriptions will be made for displaying a list of the files stored in the hard disc drive 240 through the display unit 214 provided in the network printer 200 according to an exemplary embodiment of the present invention.

Referring to FIG. 4, if a display request signal, requesting to display a file stored in the hard disc drive 240, is received through the input unit 212 provided on the operation panel 210 in step S600, the printer control unit 260 displays a list of the files stored in the hard disc drive 240 through the display unit 214 provided on the operation panel 210 in step S602.

If a user selects any of the files displayed on the display unit 214 in step S604, the printer control unit 260 determines whether the selected file is a protected file in step S606. The printer control unit 260 checks the print options stored on the additional information record area of the hard disc drive 240, and accordingly determines whether the selected file is protected or not. In step S608, if the selected file is determined to be unprotected as a result of the determination in step S606, the printer control unit 260 proceeds to step S614 which will be described later.

If the selected file is determined to be a protected file in step S606, the printer control unit 260 displays a message through the display unit 214, requesting a user to input user information such as a user name and a user password in step S610. If the user inputs the user name and the user password in response to the message, the printer control unit 260 compares the input user name and password with the print-authorized person name and password and check whether they match in step S612. If the input user name and password do not match the user name and password preset in the selected file, the printer control unit 260 displays a request message a predetermined number of times, namely three times, to request the inputting of the user name and password, and, if the two information elements still do not match, the printer control unit 360 outputs a warning message and stops displaying the input-request message.

If the input user name and password match the print-authorized person name and password preset in the selected file as a result of the comparison, the printer control unit 260 displays a request message, requesting a user to input the pages of requested printouts through the display unit 214 in step S614. If the user inputs the number of pages of requested printouts in response to the corresponding request message, prior to performing printing operation, the printer control unit 260 determines whether the pages of authorized printouts are preset in the selected print file in step S616.

If the number of pages of authorized printouts are not set in the selected file in step S616, the printer control unit 260 proceeds to step S620 for printing tasks, which will be described below. On the other hand, if the number of pages of authorized printouts are determined to be set in the selected file, the printer control unit 260 determines whether the number of printing pages requested by the user falls within an authorized range of printing pages which is allowed for the corresponding print-authorized person in step S618.

If the number of pages of requested printouts, input by the user, falls within the range of authorized printouts, the printer control unit 260 controls the print engine unit 250 to print the selected file in the number as requested by the user in step S620. The print engine unit 250 performs print tasks according to the control of the printer control unit 260.

If the pages requested by the user exceed the range of the authorized printouts allocated to the print-authorized person, the printer control unit 260 displays a warning message through the display unit 214 in step S622, and displays a message, requesting the user to re-input the number of pages of requested printouts in step S624. Steps S622 and S624 are repeated a predetermined number of times, namely three times, if the input information about the number of pages of requested printouts do not fall within the range of authorized printouts. Steps S622 and S624 are terminated if the re-input information does not satisfy the condition of step S618.

As the print engine unit 250 performs print tasks by the number as requested by the user, the printer control unit 260 decreases the pages of authorized printouts stored on the additional information record area of the hard disc drive 240 accordingly in step S626.

The printer control unit 260 also checks whether the pages of authorized printouts have been printed so that there remains zero pages for all users in step S628. If so, the printer control unit 260 deletes the selected file out of the hard disc drive 240 in step S630.

As described with reference to several embodiments of the present invention, a user is able to set a secure function for the files when storing the files prepared on their terminals into a storage unit provided in a network printer. Additionally, the user is able to authorize a plurality of users to print the protected file. Furthermore, protection of the files is ensured because print tasks are only performed if the user name and password input by the user match the print-authorized person name and password which was pre-set in the secure file.

Also, as described with reference to certain embodiments of the present invention, because information such as the number of pages of authorized printouts are pre-set and stored for each file as the file is stored in the storage unit of the network printer, printing of an excessive amount of pages can be prevented. Furthermore, because the file is deleted after being printed by authorized users, it efficiently uses the storage space.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations should be apparent to those skilled in the art.

What is claimed is:

1. A network-based image forming device for storing and printing a secure print file sent from at least one user terminal connected through a network, comprising:
   an interface unit for providing a communication interface with the user terminal;
   a storage unit for receiving and storing a secure print file from the user terminal through the interface unit, wherein the secure print file is a file in which a print-authorized user's name and password and a number of printouts are set;
   a display unit for displaying as list of print files stored in the storage unit;
   an input unit for receiving a selection of a print file from the displayed list and an input of information; and
   a control unit for, if a secure print file is selected from the displayed list, receiving a user's name and password through the input unit, and, if the received user's name and password match the print-authorized user's name and password stored in the storage unit, performing print tasks within the number of printouts.

2. The network-based image forming device as claimed in claim 1, wherein the control unit decreases the number of printouts for the print-authorized person set in the secure print file as the secure print file stored in the storage unit is printed, and, if the number of authorized printouts of all of the print-authorized users are decreased to zero, deletes the file from the storage unit.

3. The network-based image forming device as claimed in claim 1, wherein the display request signal is input through the input unit or through an input unit provided on the user terminal.

4. The network-based image forming device as claimed in claim 1, wherein the list of files is displayed through the display unit or through a display unit provided on the user terminal.

5. The network-based image forming device as claimed in claim 1, wherein a plurality of print-authorized persons are set in the secure print file.

6. The network-based image forming device as claimed in claim 1, wherein, if a number of requested printouts input through the input unit is less than the number of authorized printouts, the control unit performs print tasks according to the number of requested printouts.

7. A print secure printing method for a network-based image forming device which is capable of storing in a storage unit print files sent from at least one user terminal connected through networks, and printing the stored print files, the secure printing method comprising the steps of:
   receiving and storing a secure print file from the user terminal, wherein the secure print file is a file in which a print-authorized user's name and password and a number of printouts are set;
   displaying a list of the print files stored in the storage unit;
   if a secure print file is selected from the displayed list, receiving a user's name and password; and
   if the received user's name and password match the print-authorized user's name and password stored in the storage unit, performing printing of the secure print file within the number of printouts.

8. The secure printing method as claimed in claim 7, wherein the storage step comprises the steps of:
   determining whether a print file sent from the user terminal is a storage-purpose file;
   if the print file is for storage, determining whether the print file is a secure print file;
   if the print file is a secure print file, extracting the print-authorized user's name and password and number of printouts set in the secure print file; and
   storing the secure print file and the extracted print-authorized user's name and password and number of printouts in the storage unit.

9. The secure printing method as claimed in claim 7, wherein a plurality of print-authorized users are set in the secure print file.

10. The secure printing method as claimed in claim 9, wherein the performing printing step further comprises the step of:
    receiving an input of a number of requested printouts;
    if the user's name and password match the print-authorized user's name and password, determining whether the number of requested printouts is less than the number of authorized printouts; and
    if the number of requested printouts is less than the number of authorized printouts, performing print tasks according to the number of requested printouts.

11. The secure printing method as claimed in claim 10, further comprising the steps of:
    decreasing the number of authorized printouts according to the number of requested printouts; and
    deleting the file stored in the storage unit if the number of authorized printouts remaining for all print-authorized users are decreased to zero.

12. A network-based image forming device for storing print files sent from at least one user terminal connected through networks and printing the stored print files, the network-based image forming device comprising:
    an interface unit for providing a communication interface for the network-based image forming device with the user terminal;
    a storage unit at the network-based image forming device for storing the files sent from the user terminal through the interface unit and a number of authorized printouts set in the print files; and
    a control unit at the network-based image forming device for displaying a list of the files stored in the storage unit based on a display request signal which requests a display of the stored files, and, if a file is selected from the displayed list of the files, displaying a request message to request an input of a number of requested printouts for the selected file, and, if the number of requested printouts as input in response to the request message fall within a range of authorized printouts set in the selected file, printing the selected file according to the number of requested printouts.

13. The network-based image forming device as claimed in claim 12, wherein the control unit displays a request message to request the input of the number of requested printouts only if there exist the number of authorized printouts set in the selected file.

14. The network-based image forming device as claimed in claim 12, wherein the control unit decreases the number of authorized printouts set in the file stored in the storage unit when the file is printed, and, if the number of authorized printouts are decreased to zero, deletes the file from the storage unit.

15. A secure printing method for a network-based image forming device which is capable of storing in a storage unit print files sent from at least one user terminal connected through networks and printing the stored print files, the secure printing method comprising the steps of:
- displaying, at the network-based image forming device, a list of the files stored in the storage unit in response to a display request signal;
- if a file is selected from the displayed list of the files, displaying, at the network-based image forming device, a request message to request an input of a number of requested printouts for the selected file; and
- if the number of requested printouts, which are input in response to the request message, fall within a range of authorized printouts set in the selected file, processing such that the selected file is printed according to the number of requested printouts.

16. The print secure method as claimed in claim 15, prior to the message display step, further comprising the step of determining whether the number of authorized printouts are set in the selected file.

17. The print secure method as claimed in claim 15, further comprising the steps of:
- decreasing the number of authorized printouts set in the file according to the print task; and
- deleting the file from the storage unit if the number of authorized printouts for the selected file is decreased to zero.

18. A user terminal connected through a network to a network-based image forming device for storing print files and printing the stored print files, the user terminal comprising:
- a storage unit in which a printer driver is installed;
- a terminal interface unit for providing communication interface with the network-based image forming device;
- a display unit for displaying a setting window provided by the printer driver;
- an input unit for receiving a print command; and
- a terminal control unit for driving the printer driver in response to the print command received through the input unit, to provide the setting window, and for transmitting information set through the setting window and a corresponding print file to the network-based image forming device through the terminal interface unit,
- wherein the information includes a print-authorized user's name and password and a number of printouts with respect to the corresponding print file.

19. The user terminal as claimed in claim 18, wherein a plurality of print-authorized users are set in the print file.

20. The user terminal as claimed in claim 18, wherein the setting window displays a menu to add a print-authorized user.

* * * * *